O. Osborn,
Plow.
No. 94,636.    Patented Sep. 17, 1869.
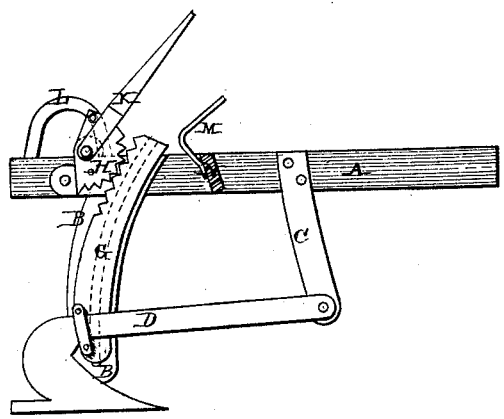
Witnesses  
C. L. Ewert  
F. Lehmann
Inventor  
O. Osborn  
per Alexander & Mason  
Att'ys.

UNITED STATES PATENT OFFICE.

O. OSBORN, OF TRUMANSBURG, NEW YORK.

IMPROVEMENT IN PLOWS.

Specification forming part of Letters Patent No. 94,636, dated September 7, 1869.

*To all whom it may concern:*

Be it known that I, O. OSBORN, of Trumansburg, in the county of Tompkins, and in the State of New York, have invented certain new and useful Improvements in Plows; and I do hereby declare that the following is a full, clear, and exact description thereof, reference being had to the accompanying drawing, and to the letters of reference marked thereon, making a part of this specification.

The nature of my invention consists in the construction of a plow which can be raised and lowered to any desired degree, and in the arrangement of the devices hereinafter set forth and described.

The accompanying drawing represents a side view of my invention.

Letter A represents the beam of the plow, to the rear end of which is attached the plate B, which extends downward, and has a circular slot cut in it, which runs from near the bottom up through the top, and which serves as a guide to retain the plow in position while being lowered and raised.

Extending downward from the beam is the brace C, to which is pivoted the plow D, which extends backward and is secured to the lower end of the bar G. This bar consists of a long curved plate, and has a number of cogs cut upon its rear upper portion, and which is secured to the guide B in such a manner that it can be raised and lowered, so as to elevate or depress the plow, and is held in place by means of the slot cut in the guide.

Pivoted to the upper part of the plate B is the cam H, which is provided with a handle, K, and which has a number of cogs cut in its periphery, so as to gear with the bar G, for the purpose of raising and lowering the plow.

Attached to the rear end of the beam is the step L, which has a number of projections extending outward from its side, against which the handle K catches, so that the plow can be securely held at any desired point.

Near the center of the beam A there is placed a cross-beam, N, to the side of which is attached a spring, M, which extends backward, so as to press downward upon the top of the board G, so as to keep it in place, and to assist in lowering the plow.

By means of the rack-bar G and cam H, the plow can be raised and lowered much more easily and readily than by almost any other method, and can be firmly and securely held at any desired point.

Having thus described my invention, what I claim, and desire to secure by Letters Patent, is—

1. The rack-bar G, in combination with the slotted guide B and cam H, when used to raise and lower the plow, substantially as set forth and described.

2. The spring M, when used to hold the bar G down, substantially as shown.

3. The plow D, rack-bar G, guide B, cam H, handle K, stop L, and spring M, when used and combined substantially as set forth.

In testimony that I claim the foregoing I have hereunto set my hand this 28th day of June, 1869.

O. OSBORN.

Witnesses:
    WILLIAM PEIRSON,
    WILLIAM FRITTZ.